United States Patent [19]

Boehringer et al.

[11] Patent Number: 4,498,647
[45] Date of Patent: Feb. 12, 1985

[54] SURFACE HOLD-DOWN MECHANISM

[75] Inventors: Wilfred E. Boehringer, Fullerton; Vincent J. Pastor, El Toro, both of Calif.

[73] Assignee: McDonnel Douglas Corporation, Long Beach, Calif.

[21] Appl. No.: 358,320

[22] Filed: Mar. 15, 1982

[51] Int. Cl.³ .............................................. B64C 9/02
[52] U.S. Cl. .................................. 244/75 R; 244/213; 244/75 A
[58] Field of Search ............... 244/75 R, 75 A, 224, 244/220, 221, 223, 230, 231, 232, 87, 226, 82, 213, 215; 74/470; 16/280, 282, 285; 267/57, 154

[56] References Cited

U.S. PATENT DOCUMENTS

| 221,168 | 11/1879 | Gilfillian | 16/282 |
|---|---|---|---|
| 590,572 | 9/1897 | Henry | 16/282 |
| 2,370,844 | 3/1945 | Davis | 244/82 |
| 2,550,756 | 5/1951 | Bartoszek | 16/280 |
| 2,584,667 | 2/1952 | Bockrath | 244/38 |
| 2,711,867 | 6/1955 | Feeney et al. | 244/87 |
| 2,881,631 | 4/1959 | Riccius | 74/470 |
| 3,805,413 | 4/1974 | Burny et al. | 244/223 |
| 3,883,093 | 5/1975 | Violleau | 244/420 |
| 4,173,322 | 11/1979 | Macdonald | 244/75 A |

Primary Examiner—Galen L. Barefoot
Attorney, Agent, or Firm—Paul T. Loef; George W. Finch; Donald L. Royer

[57] ABSTRACT

A mechanical biasing device to drive an aircraft control surface to a predetermined position relative to the main airfoil, either directly or indirectly through a linkage system, while also providing sufficient clamping force at the neutral position so that the airfoil and control surface behave dynamically like a single structure.

6 Claims, 7 Drawing Figures

SURFACE HOLD-DOWN MECHANISM

BACKGROUND OF THE INVENTION

This invention pertains to airfoils with control surfaces, and more particularly to biasing means to positively position the control surface in a predetermined position relative to the airfoil in the absence of an overcoming actuator force.

Typically, in airfoil designs having a trailing control surface, e.g. a wing and aileron, it is necessary to provide means to restrain the control surface in the event the means used to actuate the surface fails in a fashion which allows the surface to rotate freely about its hinge line. Some retention means is necessary to stabilize the control surface allowing air loads to move the surface to the faired position relative to the airfoil so as to permit limited maneuvering and landing of the aircraft, after the failure, by use of the remaining control surfaces. Classically, mass was added at the proper location on the control surface so as to behave as a counterbalance, stabilizing the surface in a neutral or faired position. While the counterbalance technique added weight it was advantageous to prevent flutter and had the obvious advantage of minimizing the effect on the control stick forces as the only variables were aerodynamic load and the rate of acceleration of the control surface. Since the rate of acceleration of the control surface was a function of the rate the pilot moved the control stick, increased load as a result of increased acceleration rates were desirable. Had a spring been used as a baising means the stick force would have varied with stick displacement as a result of the springs. The counterbalance technique worked well with manually actuated control surfaces through direct drive cable systems or power boosted systems with conventional wing design as opposed to current advanced technology wing design. Basically, any boost system, whether aerodynamic boost or a boost actuator, involves, in part, a manual system.

Introduction of the fully powered control surface changed things somewhat. The above noted requirements essentially remain the same except the full powered system provides adequate muscle to drive the control surface and the load characteristics are not important as they are not felt by the pilot. This is true whether the actuator is driven by a cable which positions a valve or an electrical signal is carried on a wire to the actuator. Prior art full powered control systems employed a three actuator system where two actuators were redundant. The redundancy was required for safety. For example a failure that demands a hard-over control surface, like a valve jam, is passive in nature and can go undetected for long periods of time in the three actuator system. A hard-over command on the first actuator requires a similar hard-over command in the opposite direction to neutralize the force of the first actuator. Since these two forces are equal and opposite, if there were only two actuators, the surface would return to a neutral or faired position only if there was a restoring force sufficient to increase pressure in the jammed actuator above its relief valve setting. To remedy this problem a third actuator was employed, and since the first and second actuators offset each other, the third actuator was required to overcome the relief valve. The need for three actuators is really established by the fact that hardover jam failures cannot be tolerated in some control surfaces in certain phases of the flight envelope.

The advent of the advanced technology wing, which improves aerodynamic efficiency, moved the center of aerodynamic pressure aft on the airfoil as compared to that of the conventional airfoil design. Again, referring to the wing and aileron, this aft loading increases the aerodynamic forces acting on the control surface requiring greater forces to neutralize the surface when the acuator power is lost. Since there are practical limits on the length of the moment arm and structural limits, particularly at the wing tip, this generally means increased weight to balance the aerodynamic loads.

Another associated but not directly related problem is flutter of the control surface. In a true flutter condition the control surface is excited at its natural frequency and there is insufficient dampening to attenuate the vibration and the surface will continue to oscillate at greater amplitudes until failure occurs. Typically this happens as a result of a complex coupling of the control surface with another structure, such as the wing. Counterbalancing the control surface with weight produces an overbalancing moment which increases as the motion of the wing or main airfoil increases and acts in the opposite direction, i.e. out of phase, also, the overbalancing moment is directly proportional to the acceleration which is not true of the spring, probably the worst case occurs when there is some float in the control surface. This float could be supplied by sufficient backlash at the hinge line but more typically it occurs when there is a mechanical failure as discussed above, where the surface is free to float about its hinge line. If the surface is properly counterbalanced it will take care of the first problem, discussed above, which provides for stabilizing the surface, allowing the remaining controls to fly the airplane. However, in this arrangement, the surface is still free to float and may flutter if there is an adquate coupling of the structures and inadequate dampening.

The control surface must have a natural frequency sufficiently removed from the main airfoil to prevent coupling. The object of this invention is to make the main airfoil and the control surface act as a single unit by providing a stiff biasing means between the two surfaces.

In summary, prior art airfoils having trailing control surfaces were designed to accommodate a failure which permits the control surface to float by adding counterbalance weights to prevent the control surface from fluttering. The only resistance to the flutter is provided by the moment of inertia of the control surface unless fluid dampeners are added. Alternatively, in full power systems, it requires three actuators, two of which are redundant, to provide adequate safety and the system relies on the actuators to lock the system to prevent flutter of the control surface.

It is an important object of the present invention to provide a positive mechanical bias to the control surface which will return the control surface to a neutral or faired position, relative to the airfoil, in the event that all actuator power is lost.

Another important object of the present invention is to concurrently provide a clamping means at this neutral position which does not allow any float or freedom of rotation of the control surface to avoid a flutter conducive condition by making the main airfoil and the control surface behave as a single structure to avoid dynamic coupling.

A further object of this invention is to provide a full powered control surface employing two actuators, one for redundancy, along with the surface hold down mechanism of this invention which will accommodate an error which provides a hard-over command signal to one actuator which can be overcome by the second actuator as it is assisted by the force of the biasing means.

Another object of this invention is to provide a surface holdown mechanism which is entirely mechanical, highly reliable and provides a system with a detectable failure mode. Yet it is lighter, less complicated, cheaper, and more reliable than the methods of the prior art.

SUMMARY OF THE PRESENT INVENTION

In summary, the control surface hold down mechanism of this invention accomplishes the above objects and overcomes the disadvantages of the prior devices by providing an airfoil and control surface combination with a surface hold down mechanism. The invention consists of a mechanical biasing means to drive the control surface to a predetermined or neutral faired position relative to the airfoil in the event of total failure of the actuating means to the control surface and to provide sufficient clamping force in this position so that the airfoil and control surface essentially behave as a single unit to avoid a flutter conducive condition. In the preferred embodiment, the control surface is remotely driven and clamped through a linkage system which allows for a wide range of hinge moments versus surface position by judicious selection of the members of the linkage system. However, in the simplist embodiment, the control surface is directly driven by a mechanical torsion bar spring which is preloaded to provide the clamping force in the neutral position. This invention provides a simple, reliable, mechanical means for counterbalancing the control surface on any airfoil. At the same time, it provides sufficient clamping force to maintain the control surface in the neutral position, eliminating the need to mass balance the control surface or, alternatively, in full powered control systems, a more complicated multiple actuator system.

BRIEF DESCRIPTION OF THE DRAWINGS

With reference to the drawings, wherein like reference numerals designate like portion of the invention.

DETAILED DESCRIPTION OF THE PREFERRED EMBODIMENT

Figure 1:
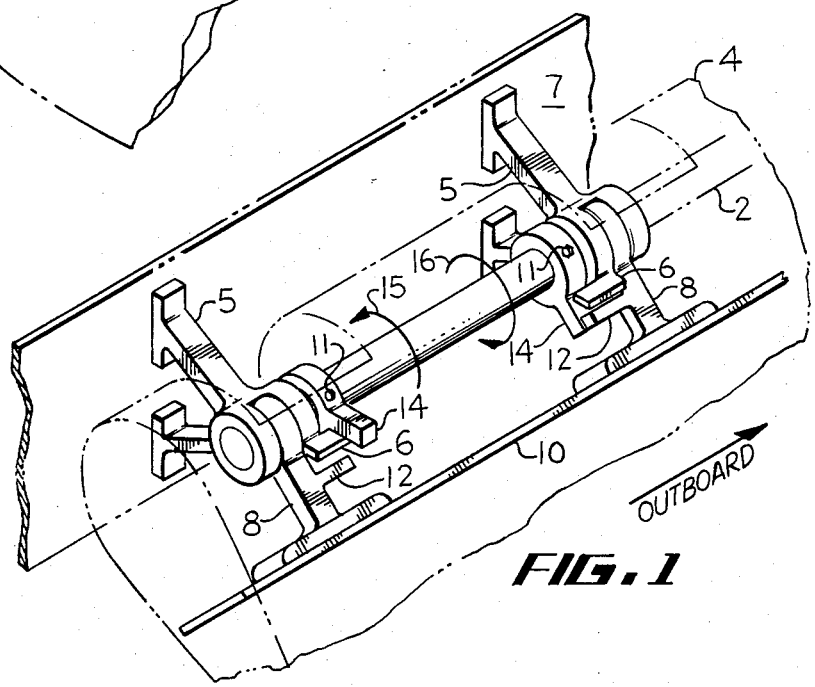
FIG. 1 is a perspective view of a simple hold down mechanism located on the hinge axis of the control surface to directly drive the surface with a predetermined clamping force to return the surface to a neutral position in the absence of an actuator force.

FIG. 1 shows a perspective of what may be considered one of the more simple embodiments of the invention. In this embodiment, the biasing means is a torque tube which is located on the axis of rotation of the control surface and provides a direct drive to the control surface. The torque tube 1, which is the biasing means, is shown as an extension of the hinge axis 2 of the control surface 4. A pair of brackets 5, one of which is inverted in rationship to the other, support the torque tube 1. Integrally attached to the bracket 5 is a fixed stop 6 and the brackets 5, in turn, are attached to the rear spar 7 of the airfoil. While this invention could be applied to any airfoil having a leading or trailing control surface for the sake of simplicity, the airfoil is identified herein as a wing and the control surface as an aileron. Also, inboard and outboard directions are simply to aid in description and could be reversed in application. The pair of aileron brackets 8 are shown attached to the front spar 10 of the aileron control surface 4 at one end and circumscribing the torque tube 1 at the opposite end. Integrally attached to the aileron brackets 8 is a rotating stop 12 which is located so as to be radially displaced about the torque tube 1 centerline so that fixed stop 6 on the bracket 5 can be radially cleared by the rotating stop 12 as the aileron 4 rotates about its hinge axis 2. A pair of torque levers 14 are attached at either end of the torque tube 1 by the fasteners 11 and are radially displaced with respect to each other on the torque tube so as to insure the proper preloading of the torque tube. The torque preload is determined by the radial displacement of the two torque levers 14 as they engage opposite sides of the fixed stops 6 on their respective brackets 5. The direction of the pretorque in the tube 1 is shown by the arrows 15 and 16.

Now, during a downward displacement of the aileron 4, which is actually the position shown in the perspective of FIG. 1, the rotating stop 12 on the outboard aileron bracket 8 engages the torque lever 14 increasing the torque on the torque tube 1 which is resisted by the inboard torque lever 14 bearing against the fixed stop 6 of the inboard bracket 5. Again starting from neutral, an upward rotation of the aileron 4 causes the rotating stop 12 on the outboard aileron bracket 8 to engage the fixed stop 6 on the outboard bracket 5 while the inboard torque lever 14 is picked up by the rotating stop 12 on the inboard aileron bracket 8 which lifts the inboard torque lever 14 off the fixed stop 6 on the inboard bracket 5, rotating the torque tube in the same direction as the preload. Hence, it can be seen that rotation of the aileron upward or downward acts to increase the preloaded torque in the torque tube 1. Of course, the actuator to rotate the aileron is not shown and is independent of the surface hold down mechanism. This embodiment provides a torque versus angular displacement of the aileron which is positive and linear at a constant slope above the pretorque load in either the down or up position.

Figure 2:
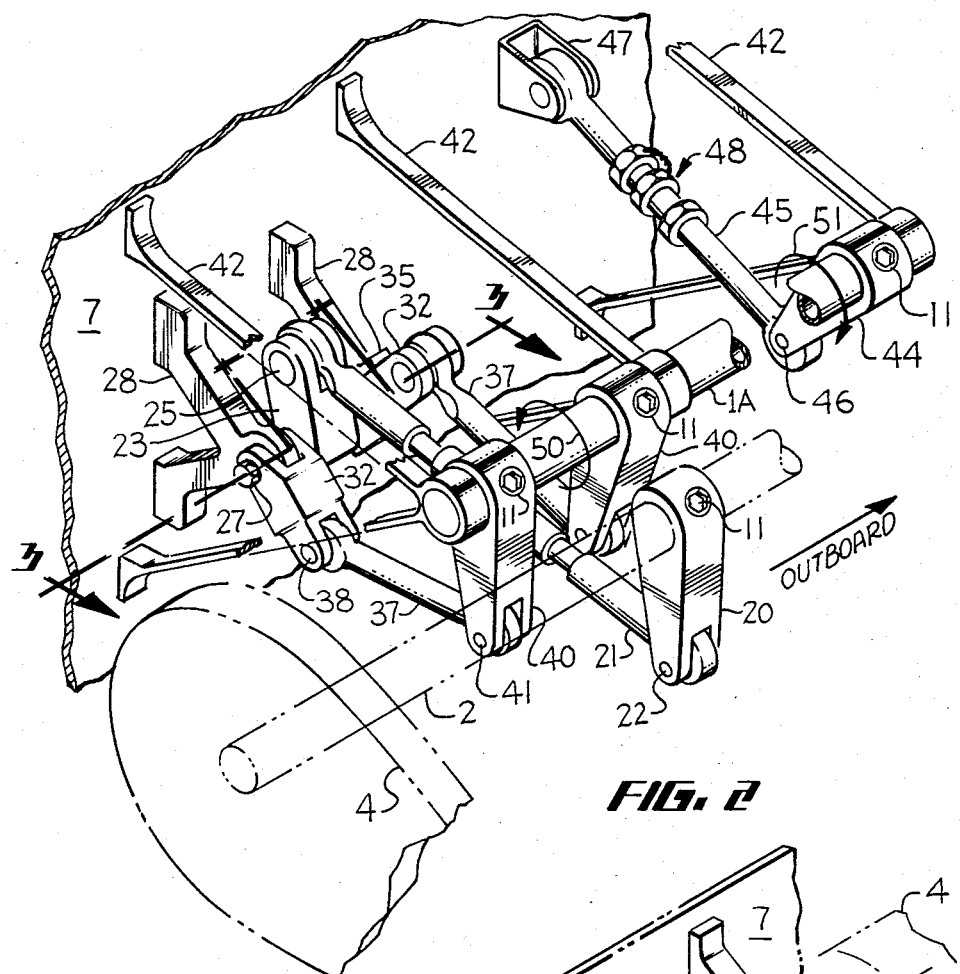
FIG. 2 is perspective view of a more complex hold down mechanism which remotely drives and clamps the control surface through a four-bar linkage system.
Figure 3:
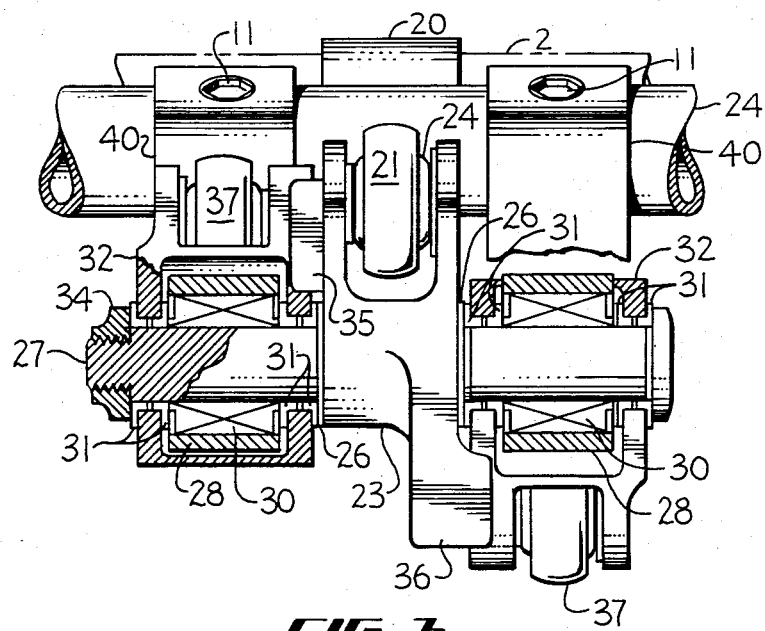
FIG. 3 is an enlarged partial section view of the perspective of FIG. 2 cut at 3—3 showing a rearview of the assembly.

FIGS. 2 and 3 depict an alternative and the preferred embodiment of this invention. In this embodiment, the torque tube is remotely driven and the control surface clamped through a four-bar linkage system. The advantages of the linkage system is that it offers a wider range of hinge moments versus surface position, from increasing with surface angle to decreasing with surface angle or, alternatively, different hinge moments up and down.

The aileron or control surface 4 is shown in reference lines and is supported by a hinge axis 2, also shown in reference lines. The aileron actuator system and hinge axis supports are not shown as they are well-known in the prior art. Attached to the aileron hinge axis 2 is the drive crank 20 by the fastener 11. The other end of the drive crank 20 terminates in a clevis to receive the adjustable idler link 21 which is pin connected at 22 so as to be free to rotate. The other end of the adjustable idler link 21 is shown terminating in a rod end with a self-aligning bearing 24 which is again pin connected to the driven link 23 at 25. The other end of the driven link 23 is pivotally supported by a pair of bushings 26 on an axle shaft 27. Axle shaft 27 is, in turn, supported by a pair of brackets 28 through a pair of bearings 30 and the brackets in turn are attached to the rear spar 7 of the wing. The shoulder bushings 31 axially support the bearings 30 and provide a bearing support for a pair of second driven links 32. The assembly of the driven link 23 and the second driven links 32, one on either side, and their supporting bearings are secured by a nut 34 on the end of the axle shaft 27. The pair of second driven links 32 are driven by means of a first stop 35 and a second stop 36 integrally attached to the driven link 23 both of which are clearly visible on the rear view of FIG. 3 and one of which, 35, is visible in the perspective view of FIG. 2. Viewing the assembled links 32, 23, and another 32 from inboard, viewing outboard, clockwise (CW) rotation of the link 23 causes the first stop 35 to engage the link 32. Counterclockwise, (CCW), rotation of the link 23 causes the second stop 36 to engage the inborad link 32. The remaining end of each second driven link 32 is pin connected to a matching pair of second idler links 37 at 38. Idler links 37 are, in turn, pin connected to the driven cranks 40 at 41 while the driven cranks 40 are fixed to the torque tube 1A by the fasteners 11. Three torque tube brackets support the torque tube 1A, one on either side of the linkage mechanism and one at the distal end of the torque tube. Just inboard of the distal end of the torque tube 1A, fixedly attached by the fastener 11 is the torque tube crank 44. The torque tube crank is in turn pinned to the static link 45 and the other end of the static link 45 is pin connected to a clevis 47 which is secured to the rear spar 7. An adjustable means 48 is shown in the static link 45 to provide adjustment, with safety wiring for securing, so as to permit preloading of the torque tube 1A.

Now, viewing the invention from inboard of the linkage, looking outboard in FIG. 2, a downward rotation of the aileron 4 produces a clockwise rotation of the crank 20, moving the idler link 21 in the direction to cause the driven link 23 to rotate counterclockwise about the axle 27. CCW rotation of the driven link 23 causes the second stop 36 to engage the inboard second link 32 causing it to rotate CCW about the same axis 27, which, in turn, moves the second idler link 37 so as to cause the inboard driven crank 40 to rotate in a CCW direction as indicated by the arrow 50. With a preload rotation of the torque tube 1A in the direction as indicated by the arrow 51, motion produced in the direction of the arrow 50 increases the load in the torque tube 1A. Alternatively, upward rotation of the aileron 4 causes the hinge axis 2 to rotate in a CCW direction, causing the drive crank 20 to rotate in a CCW direction pulling the idler link 21. Pulling the idler link 21 causes the driven link 23 to rotate in a CW direction about its axis 27 causing the first stop 35 to engage the outboard second driven link 32, producing a CW rotation of the link 32 about its axis 27. CW rotation of the outboard second driven link causes the idler link 37 to rotate the outboard driven crank 40 in a CCW direction, again causing the torque tube 1A to rotate in the direction indicated by the arrow 50. Therefore, rotation of the aileron in either the upward or downward direction produces the same rotation of the torque tube 1A.

However, judicious selection of the various lever arms and changing their location permits a wide range of hinge moments versus surface deflection, from increasing with surface angle to decreasing with surface angle or different hinge moments with upward rotation of the control surface from that associated with downward rotation of the control surface.

Figure 4:
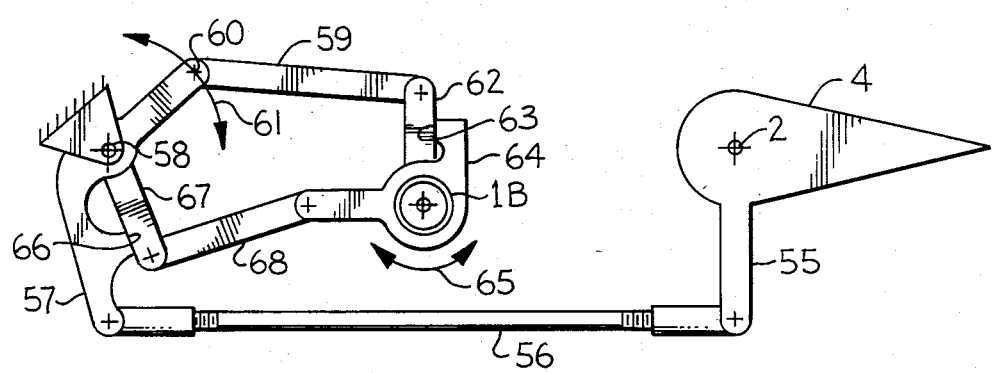
FIGS. 4, 5 and 6 are alternative embodiments the hold down mechanism which is off the hinge axis and clamps the surface through a linkage system, all of which are shown in schematic representation.

FIG. 4 reflects an alternative four-bar linkage and is shown somewhat schematically. The aileron 4 is supported for angular motion about the hinge axis 2. Downward rotation of the aileron produces CW rotation about the hinge axis 2, causing the arm 55 to rotate in a CW direction pushing the idler arm 56 so as to cause the bellcrank 57 to rotate in a CW direction about the hinge axis 58. The CW rotation of the bellcrank 57 causes the pin connection 60 between the end of the bellcrank 57 and the link 59 to rotate about the arc 61, causing the second idler 62 to rotate in a CW direction engaging the stop arm 63 against the torque tube bell crank 64, causing the torque tube 1B to rotate in a clockwise direction. CW rotation of the torque tube increases the torsion in the torque tube 1B provided it was preloaded in the direction of the arrow 65. Torsional load in the torque tube 1B continues to increase as the hinge pin 60 goes toward an oncenter position, at which time the restraining torque at the aileron falls to zero.

Upward rotation of the aileron 4 about the hinge axis 2 causes the arm 55 to rotate in a CCW direction pulling the idler arm 56 and causing the bell crank 57 to rotate in a CCW direction. CCW rotation causes the stop 66 to engage the third idler 67 and to rotate in a CCW direction about its pin support 58 causing the fourth idler 68 to again move the torque tube bell crank 64 in the clockwise direction, thus increasing the torsional load in the torque tube 1B.

Figure 5:
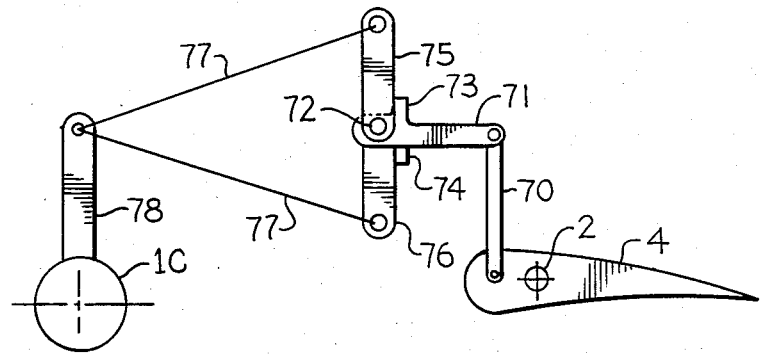

Another alternative embodiment of the linkage is again shown schematically in FIG. 5. Upward or downward rotation of the aileron 4 about the pivot axis 2 cause the link 70 top move downward or upward causing the stop link 71 to rotate CW or CCW about its pin 72. The stop link 71 is provided with a pair of stops 73 and 74 which are offset to match the offset in the driven links 75 and 76 in either direction, causing one or the other of the two driven idler links 77 to rotate the torque tube crank 78 in a CCW direction (as viewed in FIG. 5) thereby adding to the preload in the torque tube 1C.

Figure 6:
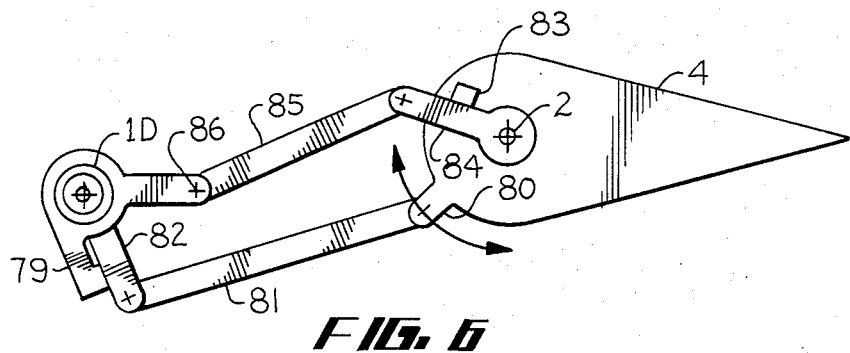

Yet another, embodiment, again shown schematically, is shown in FIG. 6. Downward rotation of the aileron 4 about the hinge axis 2 causes the attached arm 80 to rotate in a CW direction causing the first idler 81 to drive the second idler 82 against the stop arm of the torque tube crank 79 causing the torque tube 1D to rotate in a CW direction. Upward rotation of the aileron 4 causes the attached stop 83 to engage the third idler 84 causing the idler 84 to rotate in a CCW direction extending the fourth idler 85 which is pinned to the torque tube crank 79 at 86, again causing the torque tube to rotate in a CW direction. Thus upward or downward motion of the aileron 4 causes the torque tube to rotate in the same direction increasing the biasing preload torque.

It should now be reasonably obvious that those skilled in the art can develop suitable linkage systems to produce hinge moments versus control surface positions for a wide variety of requirements while producing a predetermined neutral clamp force to clamp the control surface in a neutral position after a complete failure of the control surface drive system. Also, all embodiments have shown a torque tube as the mechanical baising means, however, an air cylinder or other loading means could readily be adapted.

Figure 7:
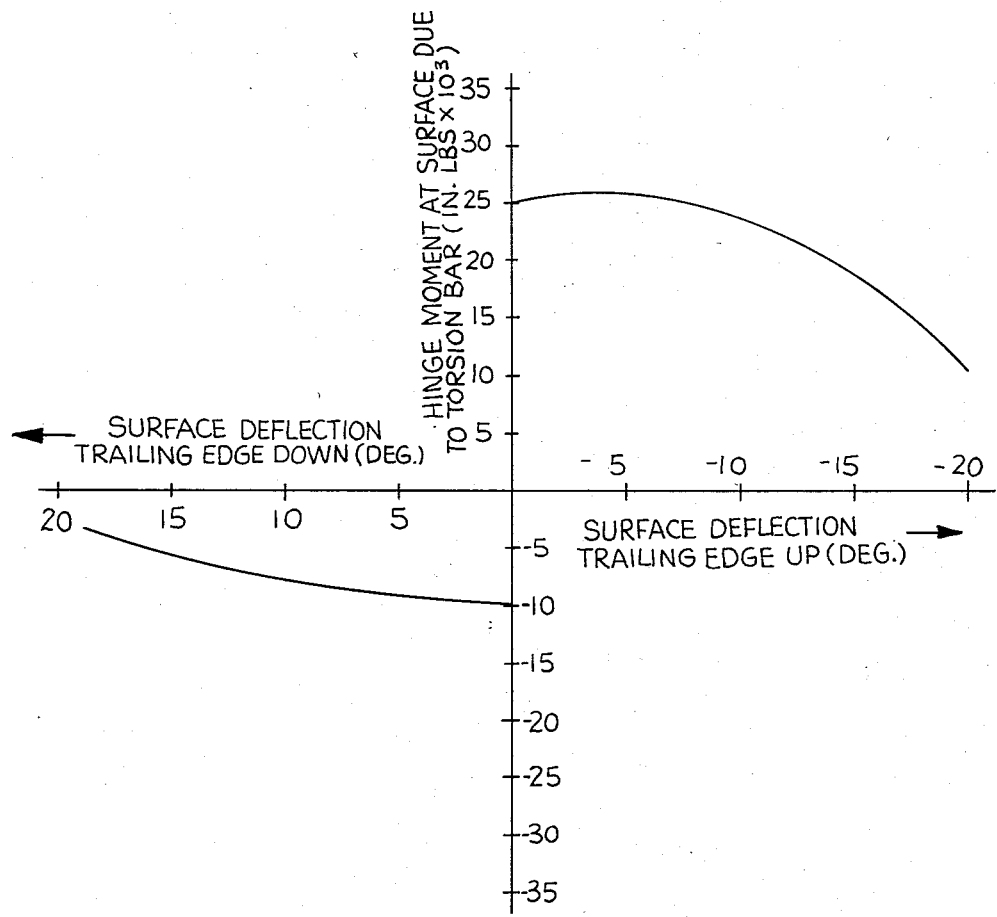
FIG. 7 is a force versus angular displacement of the control surface plot which is reflective of that available where the surface is remotely driven and clamped through a linkage system.

Representative hinge moments versus surface position for the mechanisms like FIGS. 2 and 4 is shown in FIG. 7.

It may thus be seen that the surface hold down mechanism, depicted in the alternative embodiments of this invention, serve to solve the indicated problems as well as accomplish the objectives noted. This invention is not limited to the embodiments disclosed above, but all changes and modifications thereof not constituting deviations from the spirit and scope of this invention are intended to be included.

What is claimed is:

1. In an airfoil having a hinged, driven control surface, a control surface hold-down mechanism comprising:
   a torsion bar attached to said airfoil structure;
   first and second fixed stops attached to said airfoil structure,
   first and second torque arms, axially displaced along and attached to said torsion bar and adapted to engage said first and second fixed stops on opposite sides so as to pre-load said torsion bar; and
   first and second rotating stops attached to said control surface structure, adapted to clear said first and second fixed stops and engage said first and second torque arms so that said first and second fixed stops engage said first and second torque arms, respectively, on opposite sides when said control surface is in the neutral position, and said first torque arm engages said first fixed stop with one direction of rotation of said control surface while the axially displaced second rotating stop engages said second torque arm and, alternatively, said second torque arm engages said second fixed stop with opposite rotation of said control surface while the first rotating stop engages said first torque arm, whereby said torsion bar restoring force always increases with either direction of rotation of said control surface from said neutral position.

2. The control surface hold-down mechanism of claim 1 wherein said torsion bar is axially aligned with, and directly coupled to, said control surface hinge axis.

3. In an airfoil having a hinged, driven control surface, a control surface hold-down mechanism comprising:
   a torsion bar attached to said airfoil structure;
   a first driven crank attached to said hinge axis of said control surface;
   a second driven link pivotally supported and driven by said first driven crank;
   said second driven link having first and second stops engaging, alternately, with opposite direction of rotation, one of a pair of driven links so that each of said pair of driven links always rotates in the same direction, each of said pair of driven links driving one of a pair of driven cranks attached to said torsion bar so as to always increase the spring load in said torsion bar regardless of the direction of rotation of said control surface from said neutral position; and
   means to pre-load and anchor said torsion bar.

4. The control surface hold-down mechanism of claim 3 wherein said means to pre-load and anchor said torsion bar comprises a torque tube crank which is pivotally restrained to said airfoil structure while pre-loading said torsion bar.

5. In an airfoil having a hinged, driven control surface, a control surface hold-down mechanism comprising:
   a torsion bar anchored to said airfoil remote from said hinge axis of said control surface;
   two 4-bar linkage means attached to said torsion bar so as to pre-load said torsion bar to provide a biasing force to maintain said control surface in the neutral position; and
   means to drive said two 4-bar linkage means so that said biasing force always increases with either clockwise or counterclockwise rotation of said control surface.

6. In an airfoil having a hinged, driven control surface, a control surface hold-down mechanism comprising:
   a torsion bar attached to said airfoil;
   a first driven crank pinned to said hinge axis of said control surface;
   an idler link pivotally attached to said first driven link;
   a second driven link, having first and second stops, pivotally attached to said idler link at one end and pivotally attached at the other end to said airfoil;
   a pair of driven links pivotally attached at one end to said airfoil and arranged to alternately, with opposite direction of rotation of said control surface, engage said first and second stops so that each of said pair of driven links always rotates in the same direction;
   a pair of idler links pivotally attached to said pair of driven links;
   a pair of driven cranks pivotally attached to said pair of idler links at one end and pinned to said torsion bar at the other end; and
   means to anchor said torsion bar axially remote from said pair of driven cranks while radially displacing said torsion bar with said control surface in the neutral position so as to provide a pre-load force in said torsion bar so as to bias said control surface toward the neutral position.

* * * * *